(12) United States Patent
Geerlings et al.

(10) Patent No.: US 9,563,071 B1
(45) Date of Patent: *Feb. 7, 2017

(54) APPARATUS, OPTICAL ASSEMBLY, AND METHOD THEREOF

(71) Applicant: Gentex Corporation, Zeeland, MI (US)

(72) Inventors: Kurtis L. Geerlings, Zeeland, MI (US); Donald L. Bareman, Zeeland, MI (US); Henry A. Luten, Holland, MI (US); Niels A. Olesen, Zeeland, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,967

(22) Filed: Nov. 12, 2014

Related U.S. Application Data

(60) Provisional application No. 61/903,078, filed on Nov. 12, 2013.

(51) Int. Cl.
| | | |
|---|---|---|
| *G02F 1/01* | (2006.01) | |
| *G02B 27/09* | (2006.01) | |
| *H01S 3/10* | (2006.01) | |
| *C03C 23/00* | (2006.01) | |
| *G02F 1/153* | (2006.01) | |
| *C03B 33/09* | (2006.01) | |
| *G02B 5/08* | (2006.01) | |
| *C03C 27/10* | (2006.01) | |
| *G02F 1/157* | (2006.01) | |

(52) U.S. Cl.
CPC ......... *G02F 1/0126* (2013.01); *G02B 27/0955* (2013.01); *H01S 3/10* (2013.01); *C03B 33/091* (2013.01); *C03C 23/0025* (2013.01); *C03C 27/10* (2013.01); *G02B 5/08* (2013.01); *G02F 1/157* (2013.01); *G02F 1/1533* (2013.01)

(58) Field of Classification Search
CPC .... G02F 1/157; G02F 1/1533; C03C 23/0025; C03C 27/10; C03B 33/091; G02B 5/08
See application file for complete search history.

(56) References Cited

U.S. PATENT DOCUMENTS 8,842,358 B2 * 9/2014 Bareman ............... G02F 1/157
359/267

* cited by examiner

*Primary Examiner* — Evelyn A Lester
(74) *Attorney, Agent, or Firm* — Foley & Lardner LLP; Bradley D. Johnson

(57) ABSTRACT

A laser system is configured to form at least one laser induced channel in a substrate and includes a laser and a laser path. The laser produces a laser beam, and the laser path includes an optical assembly that receives the laser beam and emits a conditioned laser beam. The optical assembly is configured to emit the conditioned laser beam with a substantially uniform focal energy distribution in a focal region defined along the direction of propagation. An apparatus includes a laser induced channel edge with a plurality of laser induced channels spanning some or all of the thickness of the substrate, which can be greater than 4 mm.

8 Claims, 3 Drawing Sheets

APPARATUS, OPTICAL ASSEMBLY, AND METHOD THEREOF

FIELD OF THE INVENTION

The present disclosure generally relates to an optical assembly and, more particularly, to an optical assembly for a laser system and method thereof.

BACKGROUND

A substrate material can be separated into two or more pieces by forming a plurality of laser induced channels along a process path located along an intended line of separation, as taught by Bareman et al. in U.S. Pat. No. 8,842,358. A laser induced channel edge can be formed upon substrate separation and can have a relatively smooth surface without the need for post-processing operations such as grinding. The thickness of the substrate through which such laser induced channels can be formed has been somewhat limited.

SUMMARY OF THE INVENTION

According to at least one embodiment, a laser system includes a laser that produces a laser beam and is configured to form at least one laser induced channel in a substrate. The laser system includes a laser path having an optical assembly that receives the laser beam and emits a conditioned laser beam. The optical assembly is configured to emit the conditioned laser beam with a substantially uniform focal energy distribution in a focal region defined along the direction of propagation.

According to at least one embodiment, a laser system includes a laser that produces a laser beam and a laser path having an optical assembly that receives the laser beam and emits a conditioned laser beam. The optical assembly is configured to emit the conditioned laser beam with a focal energy distribution in a focal region defined along the direction of propagation. An average focal energy density over a portion of the focal region is at least about 60% of a maximum focal energy density in the focal region for a given laser pulse energy, and said portion of the focal region contains at least about 60% of the total energy of the laser pulse.

According to at least one embodiment, an apparatus includes a substantially transparent substrate comprising at least one laser induced channel edge. The least one laser induced channel edge includes a plurality of laser induced channels spanning at least a portion of a thickness of the substrate, and the thickness is greater than 4 mm.

These and other features, advantages, and objects will be further understood and appreciated by those skilled in the art by reference to the following specification, claims, and appended drawings.

BRIEF DESCRIPTION OF THE DRAWINGS

Embodiments of the invention will become more fully understood from the detailed description and the accompanying drawings, wherein.

DETAILED DESCRIPTION

Figure 1:
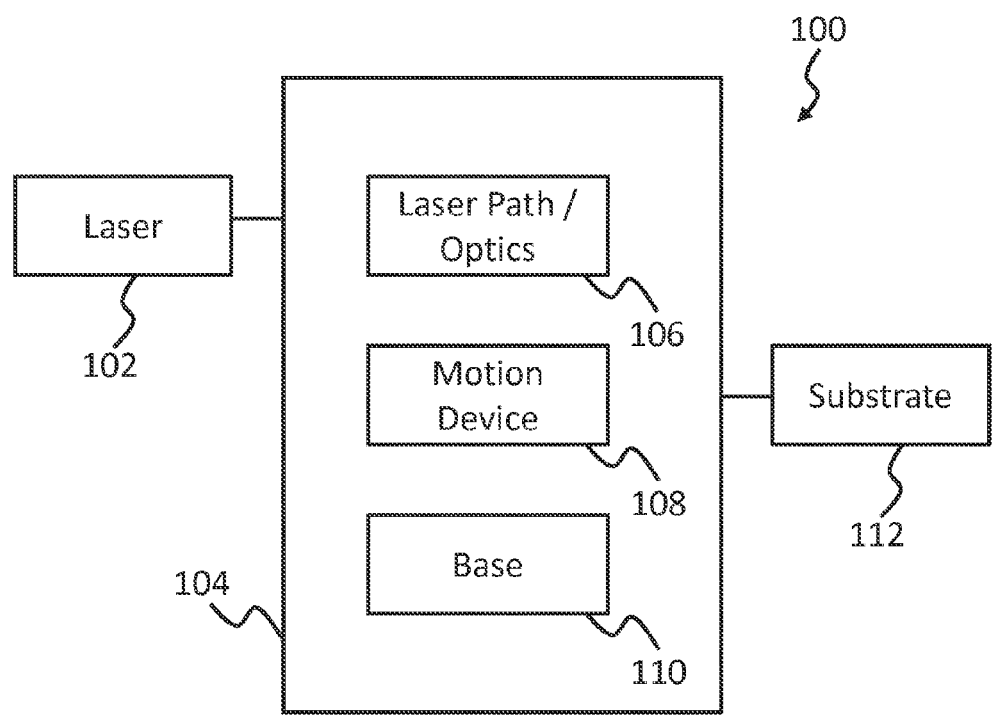
FIG. 1 is a block diagram of a laser system, in accordance with at least one embodiment.

The illustrated embodiments reside primarily in combinations of method steps and apparatus components related to an optical assembly and method thereof. Accordingly, the apparatus components and method steps have been represented, where appropriate, by conventional symbols in the drawings, showing only those specific details that are pertinent to understanding the illustrative embodiments so as not to obscure the disclosure with details that will be readily apparent to those of ordinary skill in the art having the benefit of the description herein. Further, like numerals in the description and drawings represent like elements.

In reference to FIG. 1, a laser system 100 can include a laser 102 that is in optical communication with a laser delivery assembly 104. The laser delivery assembly 104 can include a laser path or optics 106, a motion device 108 (x-axis motion, y-axis motion, and/or z-axis motion), and a base 110. The laser delivery assembly 104 can be configured to direct a beam emitted from the laser 102 to a substrate 112, as described in greater detail herein.

Figure 2:
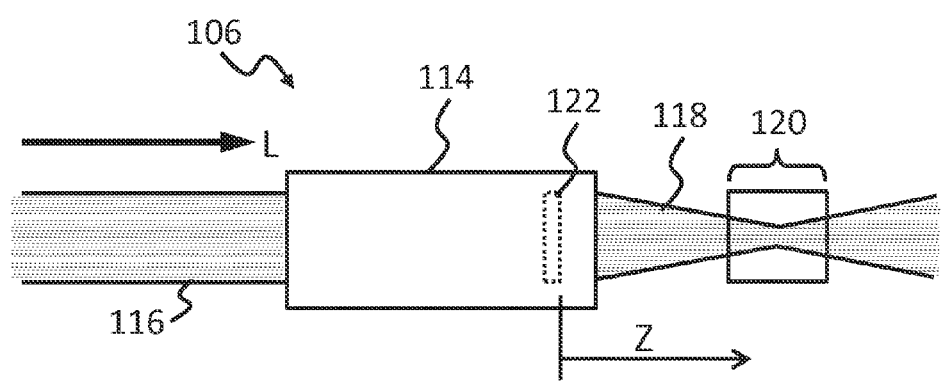
FIG. 2 is a diagram illustrating a geometric focal region of an optical assembly, in accordance with at least one embodiment.

In accordance with at least one embodiment, the laser path 106 can include at least one of a steering mirror and an optical assembly 114. As shown in FIG. 2, the optical assembly 114 may include one or more optical elements 122 (e.g., lenses or mirrors) and can be configured to accept an incoming beam of light 116 and emit a conditioned beam 118 with a geometric focal region 120 along a direction L of light propagation. The energy in the beam 118 can be focused along the focal region 120 with a given distribution to define a focal energy distribution.

Figure 3:
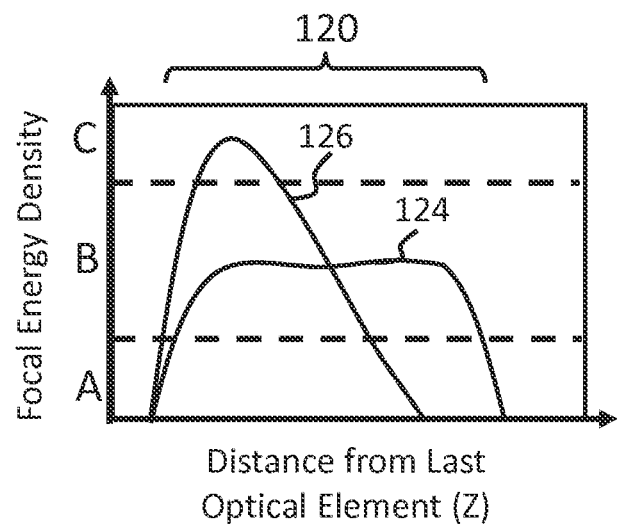
FIG. 3 is a diagram illustrating a plot of focal energy density in a focal region as a function of distance from the last optical element, in accordance with at least one embodiment.

FIG. 3 illustrates two illustrative focal energy distributions, including a uniform focal energy distribution 124 and a non-uniform focal energy distribution 126. Each focal energy distribution is these examples is representative of an amount of energy from a laser pulse that propagates through the optical assembly 114 and is focused as a function of a distance Z (in the direction of propagation) from the last optical element 122 in the laser path 106. Each focal energy distribution 124, 126 of FIG. 3 is a plot of focal energy density, which may be expressed in units of energy per unit length (e.g., J/m) as a function of distance Z. An integral of the focal energy distribution at all distances Z typically yields the laser pulse energy that propagates through the optical assembly 114. Energy that is lost due to at least one of stray reflection, absorption, or the like, within the optical assembly for example, and consequently not focused, is typically not included in the focal energy distribution.

Figure 4:
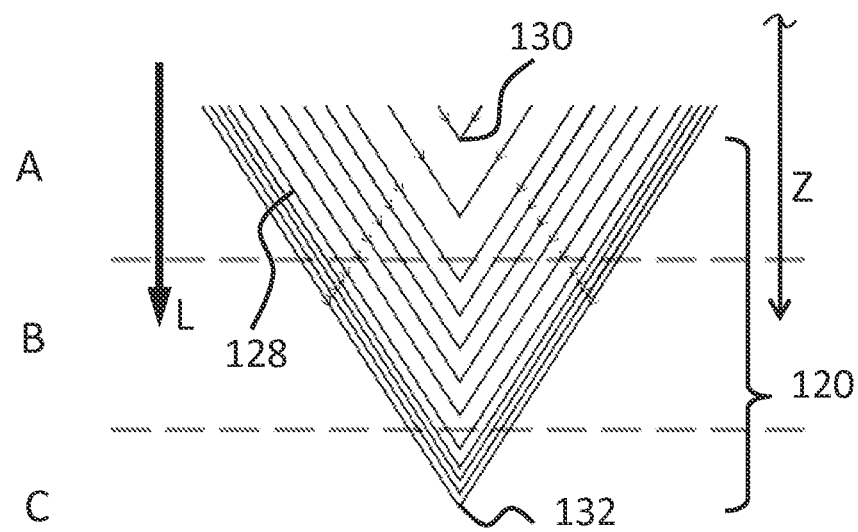
FIG. 4 and is a diagram illustrating individual light paths focusing at different locations in a focal region, in accordance with at least one embodiment.

FIG. 4 schematically illustrates one manner by which the geometric focal region 120 and the focal energy distribution for a given optical assembly or laser system can be defined and/or illustrated, which is linear optical ray tracing. In this technique, the laser beam 116 (FIG. 2) as received by the optical assembly 114, or by any optical element 122 within the optical assembly, has an areal (i.e., transverse) energy distribution across the width of the beam that can be represented as a plurality of light rays or paths having equal amounts of energy distributed according to the areal energy distribution of the incoming beam. For instance, a 24 mJ laser pulse can be represented by 24,000 distinct 1 µJ light rays entering the optical assembly. In a non-limiting example in which the incoming beam has an areal distribution that is approximately Gaussian, these representative light rays would be spaced closer together near the center of the beam and spaced further apart near the edges of the beam accordingly. Each ray is traced through each optical element of the optical assembly, changing direction at wherever the refractive index of the propagation medium changes, such as at the entry and exit surfaces of each optical element. This portion of the ray tracing technique is not shown in FIG. 4.

FIG. 4 depicts the light rays 128 after the conditioned beam is emitted by the final optical element. The geometric focal region 120 can be defined between first and last points 130, 132 along the direction L of propagation where sets of the rays 128 converge. Any portion of the focal region 120 being with a relatively greater density of converging rays (i.e., rays per unit length in the L direction) has a relatively higher energy intensity. In the example of FIG. 4, portions A, B, and C of the focal region 120 have respectively low, moderate, and high focal energy densities. In this schematic representation, five sets of light rays converge in portion B of the focal region, and five sets of rays converge in portion C. But in portion C, the converged sets of rays are spaced along a smaller distance in the direction L of light propagation, defining a higher focal energy density in portion C of the focal region 120. The corresponding focal energy distribution associated with FIG. 4 is thus represented by a curve having increased focal energy density with increased distance Z within the focal region 120.

It is noted that FIG. 4 is merely an example to illustrate the difference between higher and lower focal energy densities and the manner in which linear ray tracing can be used to define the focal region 120 and/or determine the focal energy density in the focal region. Other techniques may be used and/or developed. Further, the parallel light rays 128 in the example of FIG. 4 are used for the sake of simplicity and not necessarily representative of a desired beam configuration.

Figure 5:
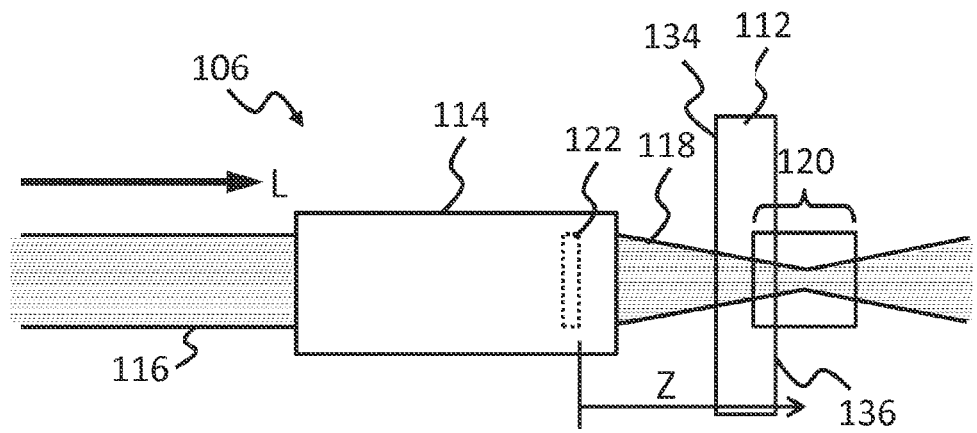
FIG. 5 is a diagram illustrating a location of material relative to a geometric focal region, in accordance with at least one embodiment.

FIG. 5 illustrates the substrate 112 in the path of the conditioned beam. When the substrate 112 is a Kerr material, a non-linear self-focusing of light within the substrate may occur by action of the optical Kerr effect. Self-focusing of the light can occur due to the non-linear susceptibility of Kerr materials which creates an index of refraction that increases in direct proportion to the intensity of light. As the index of refraction increases, the light can bend closer toward focus, which can cause the index to further increase. This can result in a self-focus effect that damages a volume of the substrate material once a certain intensity threshold is reached.

The region of distributed geometrical focus can produce an array of self-focus damage volumes approximately along a line along about an axis in a direction of light propagation. The range of distances over which these damage volumes may be closer to the optical assembly 114 (i.e., a lower value of Z) than the range of distances associated with the geometric focal region 120, but the two ranges may overlap depending on a length of the focal region. In FIG. 5, for example, the substrate 112 is located closer to the optical assembly 114 than is the geometric focal region 120, as the self-focusing effect of the substrate material effectively shifts the focal region when the substrate is placed in the path of the beam 118. The geometric focal region 120 is the focal region as determined in the absence of the substrate 112.

A plurality of self-focus damage volumes, such as a linear array of self-focus damage volumes, can form a laser induced channel within a material, spanning at least a portion of a thickness of a material or through the thickness of the material. The spacing among the damage volumes within a given laser induced channel may be such that some or all of the damage volumes overlap with other damage volumes of the same laser induced channel. Examples of laser induced channels, methods of forming them, and products made thereby are described in U.S. Pat. No. 8,842,358, issued on Sep. 23, 2014, which is hereby incorporated entirely herein by reference. A plurality of spaced apart laser induced channels can be formed in a material, such as the substrate 112, along a process path representing a desired line of separation, and the material can be separated along the laser induced channels if properly formed. According to at least one embodiment, a separation surface can be formed by a sequence of laser induced channels and optionally cracks or other damage in the substrate connecting the laser induced channels. The separation surface can be angled or perpendicular with respect to one or both opposite surfaces of the material.

It has been found that the spacing and intensity of changed material (i.e., damage volumes) within a given laser induced channel can be related to the shape of the focal energy distribution in the focal region. For example, as the energy density along the focal region decreases, the corresponding damage volumes that form a laser induced channel can have a lesser intensity or presence (e.g., smaller, spaced farther apart, and/or weaker). And as the energy density along a focal region increases, the corresponding damage volumes that form a laser induced channel can increase in intensity or presence (e.g., larger, spaced closer together, and/or stronger).

Referring again to FIG. 3, it has further been found that an approximately even or uniform focal energy distribution, such as focal energy distribution 124, along the focal region 120 can produce approximately even damage intensity within and across the thickness of the substrate 112, resulting in a two dimensional surface along the line of separation that can appear substantially uniform. Stated differently, an approximately even focal energy distribution such as distribution 124 can enhance uniformity of the damage along a length of a laser induced channel, with respect to spacing, size, and or general appearance among the plurality of damage volumes of the laser induced channel. Such uniformity of damage volumes within the laser induced channels can provide a separation surface without visible alternating layers of damage/no damage or bands of strong/weak damage, in contrast to the uneven distribution of damage volumes along the thickness of the substrate that may result from a non-uniform focal energy distribution, such as distribution 126 of FIG. 3. The non-uniform focal energy distribution 126 may produce laser induced channels with moderate damage (i.e., associated with region B) through only a small portion of the thickness of the substrate, with little or no damage in another portion of the thickness, and too much damage in yet another portion between regions of moderate damage. For example, a damage volume associated with the peak of the non-uniform distribution 126 may show up as a visible line or band along the separation surface due perhaps to each individual laser induced channel along the separation surface having an enlarged diameter associated with the peak in the focal energy distribution 126.

The above-described laser system 100 can be configured to emit a laser beam 118 with a substantially uniform focal energy distribution in a focal region 120 defined along the direction L of propagation. For instance, the above-described optical assembly 114 can be configured to emit a laser beam 118 toward the substrate 112 with a substantially uniform focal energy distribution in the focal region 120. According to at least one embodiment, the laser system 100 and/or optical assembly 114 includes one or more optical elements 122 configured to provide the laser beam 118 with the substantially uniform focal energy distribution in the focal region. One manner of configuring such an optical element includes using linear ray tracing to determine the focal energy distribution in the focal region 120 as provided by an optical element with a surface having a given shape, and modifying the shape of the surface as necessary such that a substantially uniform focal energy distribution is obtained in the focal region. Linear ray tracing may be used in reverse, starting with equally distributed light rays at the desired focal region, determining at what angle each set of light rays at particular locations across the width of the optical element must exit the final optical element to converge in a uniform manner, and configuring one or more surfaces of an optical element to emits light rays at those angles based on the change in refractive index at said one or more surfaces and based on the transverse profile of the beam received by the optical assembly.

The resulting uniform focal energy distribution represents a more efficient or optimized use of the energy contained in each laser pulse—i.e. excess energy is not wasted forming damage volumes that are unnecessarily large or intense at the expense of some other portion of the focal region having insufficient energy to form useful damage volumes. Considering, for example, the respective uniform and non-uniform focal energy distributions 124, 126 illustrated in FIG. 3, it is apparent that the total energy within the associated laser pulses (i.e., the area under each curve) is approximately the same for each distribution 124, 126. But the energy in distribution 124 is distributed such that the energy density at any given distance Z falls within the moderate damage region B along 90% or more of the focal region, while this is true for far less than half of the focal region with the non-uniform distribution 126.

Therefore, the laser system 100 as configured to emit a laser beam with an approximately even distribution of energy along the focal region can form laser induced channels in a substantially transparent substrate, wherein the length of the laser induced channel is greater than a laser induced channel formed by a non-uniform focal energy distribution for any given pulse energy. In a non-limiting example in which a laser pulse with a non-uniform focal energy distribution can form a laser induced channel through only about 3 mm of a particular substrate, the uniform focal energy distribution can form a laser induced channel spanning up to 4 mm, greater than 4 mm, greater than 4.5 mm, greater than 5 mm, and/or greater than 6 mm of substrate thickness. These examples of substrate thickness are merely illustrative and intended to indicate that with any given laser process, it may be possible to increase the thickness of the substrate through which laser induced channels can be formed with proper attention to the focal energy distribution and designing and providing optical elements that result in a uniform energy distribution.

Use of the uniform focal energy density described here is not limited to laser processes that form laser induced channels through substantially the entire thickness of the substrate for purposes of separation. Other benefits may be realized by the enhanced efficiency of such an energy distribution. For instance, it may be desired to produce laser induced channels within a substrate that are uniform along their length (e.g., decorative or otherwise functional), and the uniform focal energy density described herein can provide such uniformity whether or not the laser induced channels extend entirely through the substrate thickness and regardless of the length of the channels with respect to the substrate thickness.

The uniformity of the focal energy distribution may be gauged is different ways. According to at least one embodiment, an approximately even or uniform energy distribution may be characterized by the average energy density within a defined portion of the focal region being at least approximately 60% of the maximum energy density, at least approximately 70% of the maximum energy density, at least approximately 80% of the maximum energy density, at least approximately 90% of the maximum energy density, or a combination thereof. The portion of the focal region over which the average energy density is calculated may be a portion, continuous along the L direction, containing from 40% to 80% of the total energy in the focal region (i.e., the area under the entire curve). In different embodiments, the portion of the focal region over which the average energy density is calculated is a portion containing at least 40%, at least a majority, at least 60%, at least 70%, or at least 80% of the total energy in the focal region. In other embodiments, the portion of the focal region over which the average energy density is calculated is a central portion containing 40%, 50%, 60%, 70%, or 80% of the total energy in the focal region.

According to at least one embodiment, an approximately even or uniform energy distribution may be characterized by a relationship between the minimum focal energy density and the maximum focal energy density over a defined portion of the focal region. For example, the minimum focal energy density may be a percentage of the maximum focal energy density over a defined portion of the focal region, where the defined portion represents some percentage of the total energy in the focal region. In different embodiments, the minimum focal energy density is at least 50%, at least 60%, at least 70%, or at least 80% of the maximum focal energy density within a defined portion of the focal region, where the defined portion of the focal region represents at least 50%, at least 60%, at least 70%, or at least 80% of the total energy in the focal region.

According to at least one embodiment, the optical assembly includes an aspheric lens. In such an embodiment, the aspheric lens can produce an approximately even distribution of energy along the focal region. A lens or other optical element can be configured to receive different input beam profiles and/or widths, including, but not limited to, Gaussian and flat-top beam profiles. The focal region may be determined with a given length and distance from the lens.

With respect to the spacing of laser induced channels along the process path (i.e., the intended line of separation and location of the intended separation surface), spacing laser induced channels too close can produce damage beyond that desired (e.g., beyond a frosted edge appearance). When two laser induced channels are spaced too closely (e.g., adjacent laser induced channels), a first laser induced channel can interfere with formation of a second laser induced channel. Such adjacent laser induced channels can absorb and reflect the incoming light, which can result in heat accumulation and a formation of significant cracks and fractures.

When first and second laser induced channels are spaced too far apart from one another along the process path, it is believed that the substantially transparent substrate is not properly prepared for creation of the second laser induced channel. Lack of preparation can increase the thresholds needed for approximately even damage across a surface of the substantially transparent substrate. Thus, inter-channel spacing above a threshold can have weaker laser induced channels (e.g., shorter and/or uneven/banded) that may exhibit a lower intensity structure or presence in the form of weak or non-existent damage. It has been found that this "preparation" of the substrate for formation of a subsequent adjacent laser induced channel is generally not time critical and that the time within which the subsequent laser induced channel need be formed is on an effective time scale of greater than at least 10 ms in many cases.

In one non-limiting example of laser parameters found sufficient to form laser induced channels in a transparent substrate such as glass, a laser pulse frequency is 100 kHz with the conditioned laser beam moving along the process path at 500 mm/s. This pulse frequency is equivalent to a laser pulse or pulse burst being delivered to the substrate every 10 μs. At a process speed of 500 mm/s, laser induced channels are formed with 5 μm spacing along the process path.

According to at least one embodiment, an apparatus includes a substantially transparent substrate having at least one laser induced channel edge, wherein the edge includes a plurality of laser induced channels, and the substrate is greater than 4 mm thick, greater than 4.5 mm thick, greater than 5 mm thick, and/or greater than 6 mm thick. At least one of the plurality of laser induced channels continuously extends from an entry surface of the substantially transparent substrate to a depth thereof. According to at least one embodiment, at least one of the plurality of laser induced channels spans at least a portion of the thickness of the substrate, such as a portion of the thickness that is greater than 3 mm, greater than 4 mm, greater than 4.5 mm thick, or greater than 5 mm thick. Each laser induced channel may span a portion of the thickness of the substrate extending from an entry surface 134 (FIG. 4) of the substrate 112 to a depth thereof, extending from an exit surface 136 (FIG. 4), or extending from one point within the thickness of the substrate to another point within the thickness of the substrate. These are non-limiting examples, as substrates of any thickness may be processed to have a laser-induced channel edge with laser induced channels of any length.

Figure 6:
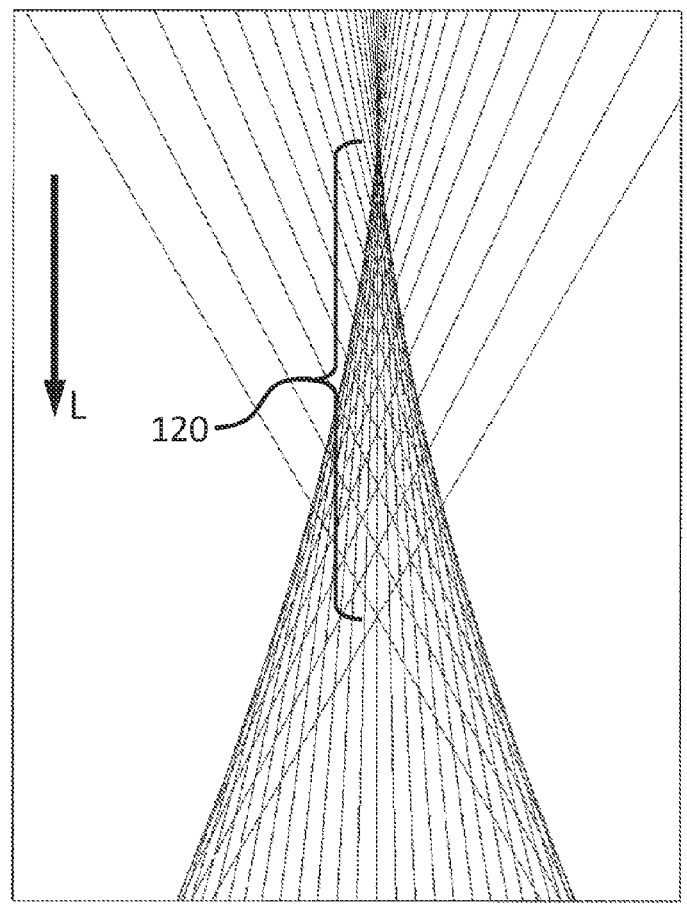
FIG. 6 is a diagram illustrating individual light paths focusing at different locations in a focal region, in accordance with at least one embodiment.

FIG. 6 illustrates another example of linear ray tracing, where the focal lines representing the light rays from the final optic may not be parallel with one another. In at least one embodiment, the laser delivery assembly 104 and/or the optical assembly can include an axicon lens. In at least another embodiment, the optical assembly includes a plurality of optical elements, including an axicon lens. An axicon lens can receive a laser beam with a transverse energy distribution having a central peak (e.g., a Gaussian distribution) and emit a beam wherein the areal energy density is distributed away from the center of the lens.

For purposes of explanation and not limitation, an apparatus having a substrate with a laser induced channel edge as described herein can include an electro-optic device, an interior electrochromic mirror, an exterior electrochromic mirror, an aircraft electrochromic window, an architectural electrochromic window, a lens cover, a display cover, a display, a microscope slide, cover glass, a mobile phone component, a DNA slide, a bar code, a stain glass window, a light emitting diode, a data storage device, a sandwich assembly comprising a plurality of substantially transparent substrates, safety glasses, eye glasses, organic light emitting diodes, watch, a spring, a two-piece spotter mirror, a curved mirror, a flat-to-curved mirror, an aspheric mirror, an interposer, sapphire, and a household device.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims as interpreted according to the principles of patent law, including the doctrine of equivalents.

As used in this specification and claims, the terms "for example," "for instance," "such as," and "like," and the verbs "comprising," "having," "including," and their other verb forms, when used in conjunction with a listing of one or more components, elements, steps, or other items, are each to be construed as open-ended, meaning that that the listing is not to be considered as excluding other, additional components, elements, steps, or items, whether the same or different as those already in the listing. Other terms are to be construed using their broadest reasonable meaning unless they are used in a context that requires a different interpretation. Relational terms, such as first and second, top and bottom, and the like, are used solely to distinguish one entity or action from another entity or action, without necessarily requiring or implying any actual such relationship or order between such entities or actions.

What is claimed is:

1. An apparatus comprising:
a substantially transparent substrate comprising at least one laser induced channel edge,
wherein said at least one laser induced channel edge comprises a plurality of laser induced channels spanning at least a portion of a thickness of the substrate, and wherein said thickness is greater than 4 mm.

2. The apparatus of claim 1, wherein the plurality of laser induced channels continuously extends from a surface of the substrate to a depth thereof.

3. The apparatus of claim 2, wherein the surface is an entry surface.

4. The apparatus of claim 1, wherein the plurality of laser induced channels spans greater than 4 mm.

5. The apparatus of claim 1, wherein at least some of the plurality of laser induced channels spans the entire thickness of the substrate.

6. The apparatus of claim 1, wherein at least one laser induced channel edge is characterized by the absence of a banded appearance.

7. The apparatus of claim 1, wherein each of the laser induced channels has a substantially uniform characteristic diameter along the entire substrate thickness.

8. The apparatus of claim 1, wherein the apparatus includes an electro-optic device, an interior electrochromic mirror, an exterior electrochromic mirror, an aircraft electrochromic window, an architectural electrochromic window, a lens cover, a display cover, a display, a microscope slide, cover glass, a mobile phone component, a DNA slide, a bar code, a stain glass window, a light emitting diode, a data storage device, a sandwich assembly comprising a plurality of substantially transparent substrates, safety glasses, eye glasses, an organic light emitting diode, a watch, a spring, a two-piece spotter mirror, a curved mirror, a flat-to-curved mirror, an aspheric mirror, an interposer, sapphire, or a household device.

* * * * *